US012474608B2

United States Patent
Chang et al.

(10) Patent No.: US 12,474,608 B2
(45) Date of Patent: Nov. 18, 2025

(54) BACKLIGHT MODULE AND DISPLAY DEVICE

(71) Applicant: Radiant Opto-Electronics Corporation, Kaohsiung (TW)

(72) Inventors: Cheng-Te Chang, Kaohsiung (TW); Hung-Wei Chuang, Kaohsiung (TW); Pei-Fen Hou, Kaohsiung (TW)

(73) Assignee: RADIANT OPTO-ELECTRONICS CORPORATION, Kaohsiung (TW)

( * ) Notice: Subject to any disclaimer, the term of this patent is extended or adjusted under 35 U.S.C. 154(b) by 0 days.

(21) Appl. No.: 18/922,972

(22) Filed: Oct. 22, 2024

(65) Prior Publication Data

US 2025/0110372 A1   Apr. 3, 2025

Related U.S. Application Data

(63) Continuation of application No. PCT/CN2023/125926, filed on Oct. 23, 2023.

(30) Foreign Application Priority Data

Sep. 28, 2023   (CN) .......................... 202311283823.5

(51) Int. Cl.
*G02F 1/13357*   (2006.01)

(52) U.S. Cl.
CPC .. *G02F 1/133608* (2013.01); *G02F 1/133603* (2013.01); *G02F 1/133605* (2013.01)

(58) Field of Classification Search
CPC ......... G02F 1/133608; G02F 1/133603; G02F 1/133605; G02F 1/133325
See application file for complete search history.

(56) References Cited

U.S. PATENT DOCUMENTS

| | | | | |
|---|---|---|---|---|
| 2011/0292316 A1* | 12/2011 | Fujimoto | .......... | G02F 1/133605 349/58 |
| 2015/0124482 A1* | 5/2015 | Kuromizu | ............ | G02B 6/0088 362/611 |
| 2017/0105296 A1* | 4/2017 | Huang | .............. | G02F 1/133608 |
| 2019/0285945 A1* | 9/2019 | Kyoukane | ......... | G02F 1/133611 |

FOREIGN PATENT DOCUMENTS

| CN | 102803824 A | 11/2012 |
|---|---|---|
| CN | 102853342 A | 1/2013 |
| CN | 115877501 A | 3/2023 |

(Continued)

*Primary Examiner* — Erin Kryukova
(74) *Attorney, Agent, or Firm* — BACON & THOMAS, PLLC

(57) ABSTRACT

A backlight module has a back plate having a supporting surface, a reflective sheet, a light source board, and at least one connecting structure. The reflective sheet is arranged on the supporting surface of the back plate along an assembling direction. The light source board is disposed between the reflective sheet and the back plate. The at least one connecting structure has a recess and a post. The recess has an opening and a guiding surface connected to the opening and inclined along a guiding direction relative to the supporting surface. The post has an end portion configured to pass through the opening of the recess and hook the guiding surface. The back plate and the reflective sheet are mounted via the recess and the post. A display device is also provided.

13 Claims, 13 Drawing Sheets

(56) References Cited

FOREIGN PATENT DOCUMENTS

| | | | | |
|---|---|---|---|---|
| JP | 2009087879 | A | | 4/2009 |
| TW | I285074 | B | * | 8/2007 |
| TW | 200923513 | A | | 6/2009 |
| TW | 201702707 | A | | 1/2017 |
| TW | 202244577 | A | | 11/2022 |

* cited by examiner

BACKLIGHT MODULE AND DISPLAY DEVICE

CROSS-REFERENCE TO RELATED APPLICATIONS

The present invention is a continuation of international Application No. PCT/CN2023/125926 filed on Oct. 23, 2023, which claims priority from China Patent application Ser. No. 202311283823.5, filed on Sep. 28, 2023. The entire contents of each of which are incorporated herein by reference.

BACKGROUND OF THE INVENTION

1. Field of the Invention

The present invention relates to a backlight module and a display device having said backlight module.

2. Description of Related Art

A conventional direct-type backlight module comprises a back plate, a reflective sheet, and a light source board disposed between the back plate and the reflective sheet. The back plate has multiple fixing points for screws to extend therethrough and fix the back plate, the light source board, and the reflective sheet, so as to complete assembly.

Due to material differences, the coefficient of thermal expansion of the reflective sheet is larger than that of the back plate, i.e. size increase of the reflective sheet is larger than that of the back plate when heated. Since the reflective sheet and the back plate are fixed to each other by screws, distances between the screws are restricted by the back plate with less size increase while heated. Meanwhile, the reflective sheet puffed up because of its larger thermal expansion leading to upward bulge, harming optical tastes, even pushing and causing falls of LEDs.

SUMMARY OF THE INVENTION

The main objective of the present invention is to provide a backlight module and a display device to improve optical tastes under thermal expansion. The present invention can pass the reliable test under severe environments. In particular, improvement of the structures between the reflective sheet and the back plate reduces upward bulging along Z-axis of the reflective sheet, so the backlight module can adapt to severe environments.

The backlight module comprises a back plate having a supporting surface, a reflective sheet, a light source board, and at least one connecting structure. The reflective sheet is arranged on the supporting surface of the back plate along an assembling direction. The light source board is disposed between the reflective sheet and the back plate and comprises a substrate board with light sources disposed thereon. The at least one connecting structure comprises a recess and a post. The recess is formed in at least one of the back plate and the reflective sheet, extends therethrough, and has an opening and a guiding surface connected to the opening and inclined along a guiding direction relative to the supporting surface, wherein the guiding surface is inclined toward a direction opposed to the assembling direction. The post passes through the recess and has an end portion and a shoulder extending through the recess to hook a bottom portion of the guiding surface. The back plate and the reflective sheet are mounted via the recess and the post.

The back plate and the reflective sheet of the backlight module in accordance with the present invention are mounted via the at least one connecting structure, utilizing the characteristic of thermal expansion of the reflective sheet to reduce bulging of the reflective sheet. As the post and the recess of the at least one connecting structure move relatively due to expansion of the reflective sheet, the end portion of the post abuts and moves under guidance from the guiding surface, so a drag force is generated to pull the reflective sheet toward the back plate. Thereby, bulging of the reflective sheet is suppressed and optical tastes can be retained. As the end portion of the post moves further along the guiding force, the drag force grows stronger to effectively suppress bulging of the reflective sheet.

The display device comprises said backlight module and a display panel. The display panel is arranged on a side of the reflective sheet away from the back plate.

By applying said backlight module, the display device in accordance with the present invention effectively prevents optical tastes from being affected by thermal expansion of the reflective sheet, thereby providing a more stable performance on light uniformity and improving reliability. Therefore, the display device is particularly suitable for products bearing high working temperature or large temperature differences, such as car display.

Other objectives, advantages and novel features of the invention will become more apparent from the following detailed description when taken in conjunction with the accompanying drawings.

DETAILED DESCRIPTION OF THE PREFERRED EMBODIMENT

Figure 1:
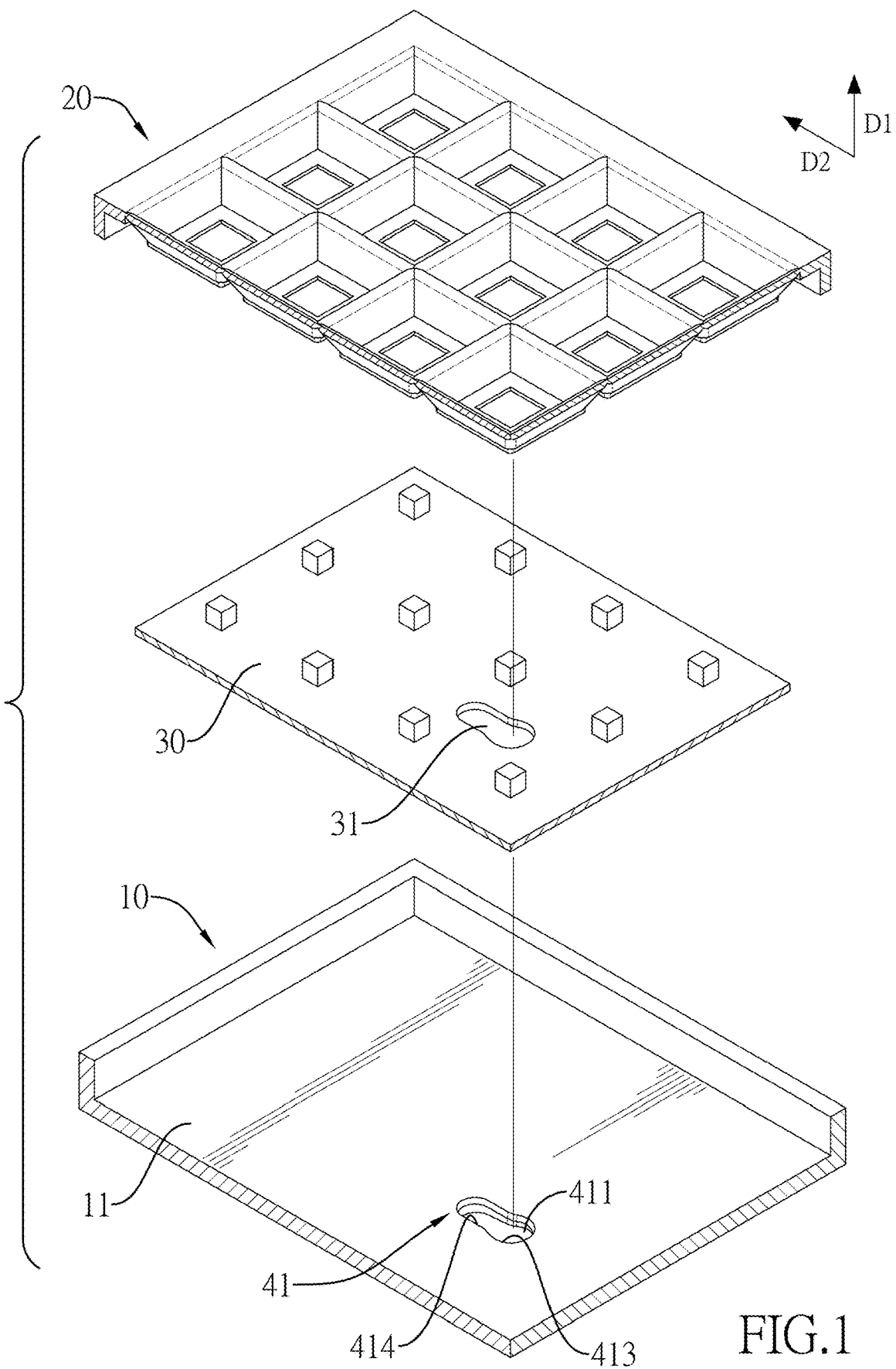
FIG. 1 is a top-perspective exploded view of an embodiment of a backlight module in accordance with the present invention.
Figure 2:
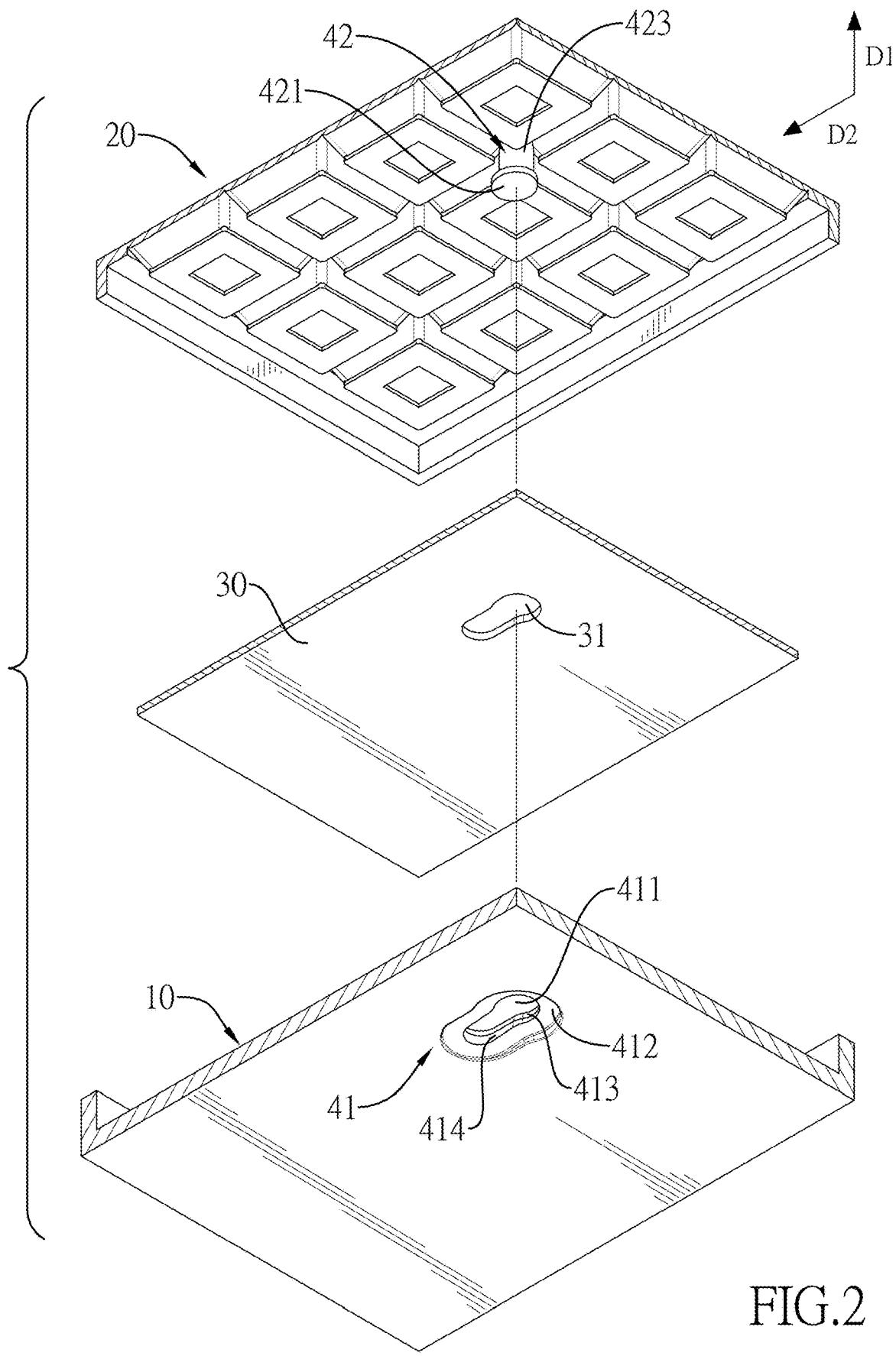
FIG. 2 is a bottom-perspective exploded view of the backlight module in FIG. 1.
Figure 3:
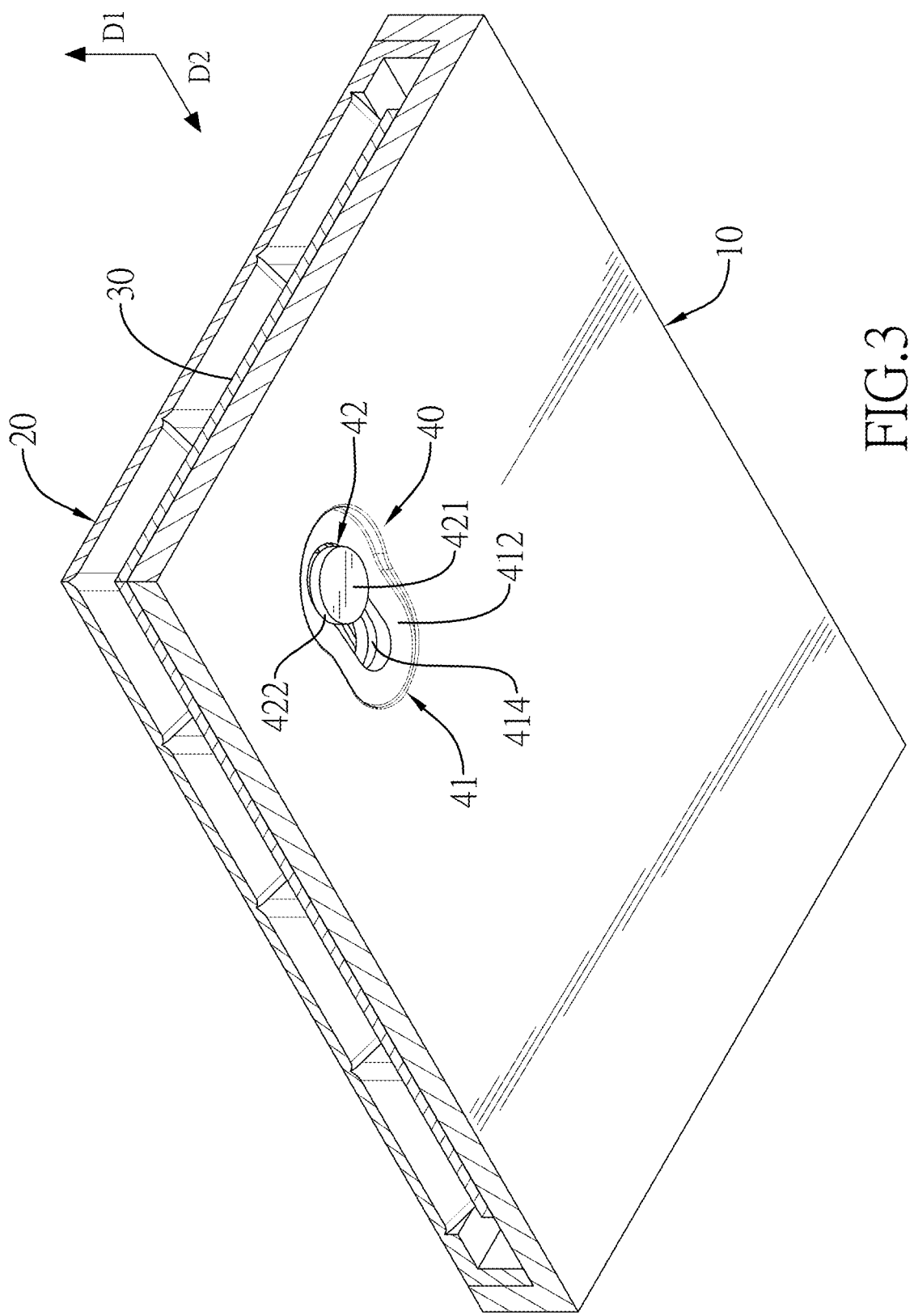
FIG. 3 is a bottom perspective view of the backlight module in FIG. 1.

With reference to FIGS. 1 to 3, an embodiment of a backlight module in accordance with the present invention comprises a back plate 10, a reflective sheet 20, a light source board 30, and at least one connecting structure 40.

With reference to FIGS. 1, 4, 5A and 5B, the back plate 10 has a supporting surface 11. The reflective sheet 20 is arranged on the supporting surface 11 of the back plate 10 along an assembling direction D1. The light source board 30 is disposed between the reflective sheet 20 and the back plate 10 and comprises a substrate board with light sources disposed thereon. The at least one connecting structure 40 comprises a recess 41 and a post 42, and the back plate 10 and the reflective sheet 20 are mounted via the recess 41 and the post 42. The recess 41 is formed in at least one of the back plate 10 and the reflective sheet 20, extends therethrough, and has an opening 411 and a guiding surface 412 connected to the opening 411 and inclined along a guiding direction D2 relative to the supporting surface 11. The post 42 has an end portion 421 configured to pass through the opening 411 of the recess 41 and hook the guiding surface 412, thereby the back plate 10 and the reflective sheet 20 are mounted, and the post 42 can move along the guiding surface 412. Therefore, as the reflective sheet 20 expands, the end portion 421 of the post 42 abuts and moves along the guiding direction D2 under guidance from the guiding surface 412.

The back plate 10 and the reflective sheet 20 of the backlight module of the present invention are mounted via the at least one connecting structure 40, thermal expansion of the reflective sheet 20 leads to relative movement to the back plate 10, i.e. the reflective sheet 20 expands either along the guiding direction D2 or away from the back plate 10, so the post 42 and the recess 41 of the at least one connecting structure 40 move relatively as well. Specifically, the end portion 421 of the post 42 moves under guidance from the guiding surface 412, and a drag force is thereby generated to pull the reflective sheet 20 toward the back plate 10. Therefore, bulging of the reflective sheet 20 can be suppressed and impacts on optical tastes of the backlight module are mitigated.

Figure 5A:
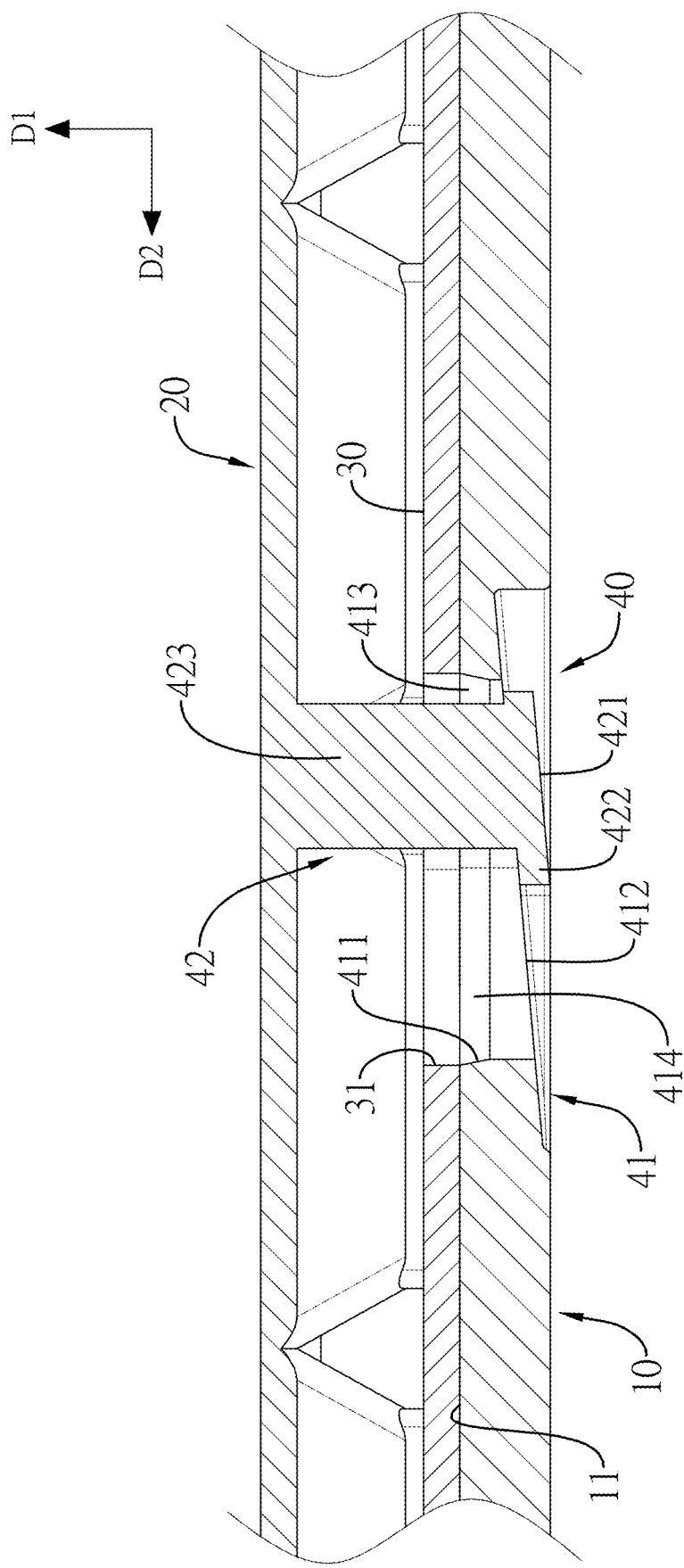
FIG. 5A is an enlarged cross-sectional side view of the connecting structure of the backlight module in FIG. 4 before displacement occurring.
Figure 5B:
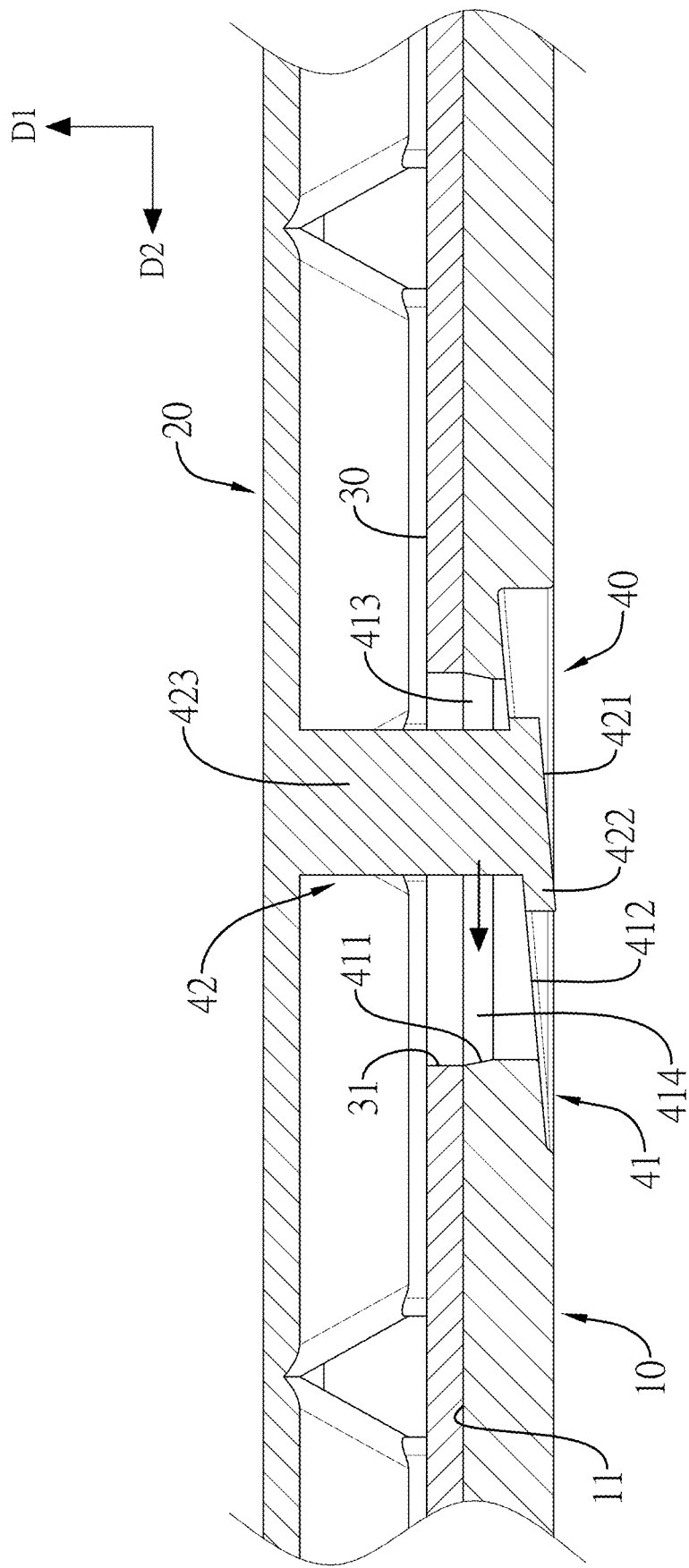
FIG. 5B is an enlarged cross-sectional side view of the connecting structure of the backlight module in FIG. 4 after displacement occurring.

FIG. 5A depicts said connecting structure 40 mounted on the back plate 10 under a normal temperature, and FIG. 5B depicts after the reflective sheet 20 thermally expands, the reflective sheet 20 and the back plate 10 being mounted with relative displacement. Said connecting structure 40 takes advantage of thermal expansion of the reflective sheet 20 to suppress bulging of the reflective sheet 20 due to thermal expansion. Normally, when the reflective sheet 20 does not expand, the end portion 421 of the post 42 still hooks the guiding surface 412 of the recess 41, so as to connect the reflective sheet 20 and the back plate 10.

Moreover, when expanding beyond a confidence interval, the reflective sheet 20 tends to be noticeably deformed. By utilizing the at least one connecting structure 40, the reflective sheet 20 may be prevented from expanding beyond the confidence interval, so the backlight module can retain optical tastes with better reliability and adapt to challenging severe environments. In addition, utilizing said connecting structure 40, extra screws or tapes used for fixing the reflective sheet 20 and suppressing expansion thereof can be saved, so costs and labor hours for assembling can also be reduced.

Furthermore, the guiding surface 412 is inclined along the guiding direction D2 and is inclined toward a direction opposed to the assembling direction D1. Thus, when the end portion 421 of the post 42 moves further against the guiding surface 412, the drag force grows stronger, and thereby effectively suppresses bulging of the reflective sheet 20. No matter which one of the recess 41 and the post 42 of the at least one connecting structure 40 is arranged on the reflective sheet 20 and the other one is arranged on the back plate 10, when the reflective sheet 20 thermally expands, the at least one connecting structure 40 can produce said drag force and thus suppress bulging degrees of the reflective sheet 20.

Besides, the recess 41 or the post 42 of the at least one connecting structure 40 may be formed integral with the corresponding reflective sheet 20 or the back plate 10, or each of the recess 41 and the post 42 may be an independent component which is mounted to the corresponding reflective sheet 20 or the back plate 10. In the present embodiment, the post 42 is arranged on the reflective sheet 20 and the recess 41 is disposed on the back plate 10, so manufacturing of the backlight module is easier. Furthermore, the recess 41 can be either a groove or a through hole. In the present embodiment, the recess 41 is a through hole and is directly formed on the back plate 10. The opening 411 of the recess 41 is formed on the supporting surface 11 of the back plate 10, so the recess 41 is easier to be formed. And the post 42 and the reflective sheet 20 are formed integral. This configuration is more convenient for assembling because there is no need to do the extra assembling work to mount said connecting structure 40 to the reflective sheet 20 and the back plate 10.

Figure 4:
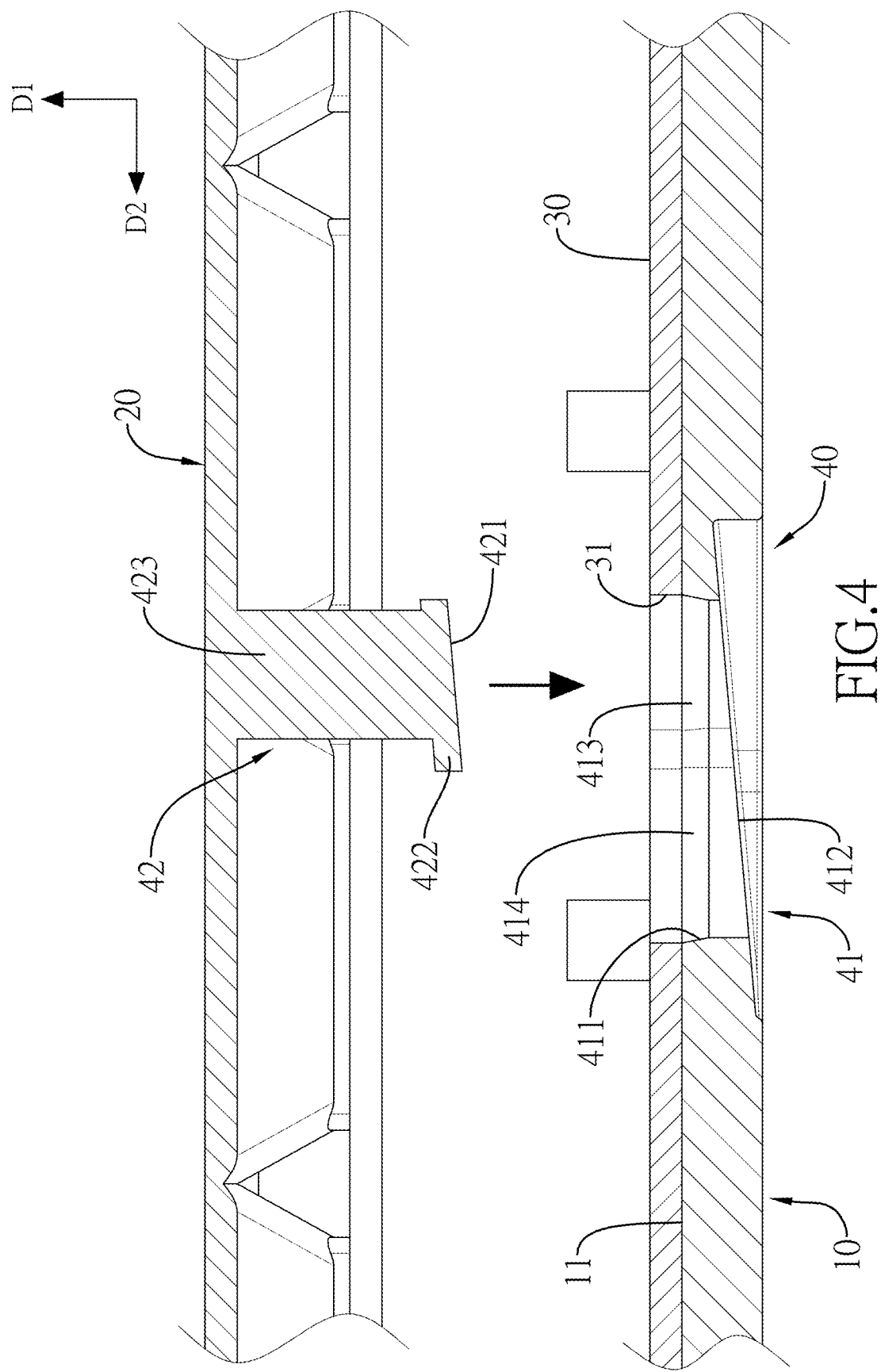
FIG. 4 is a cross-sectional side view depicting mounting of a post and a recess of a connecting structure of the backlight module in FIG. 1.
Figure 6:
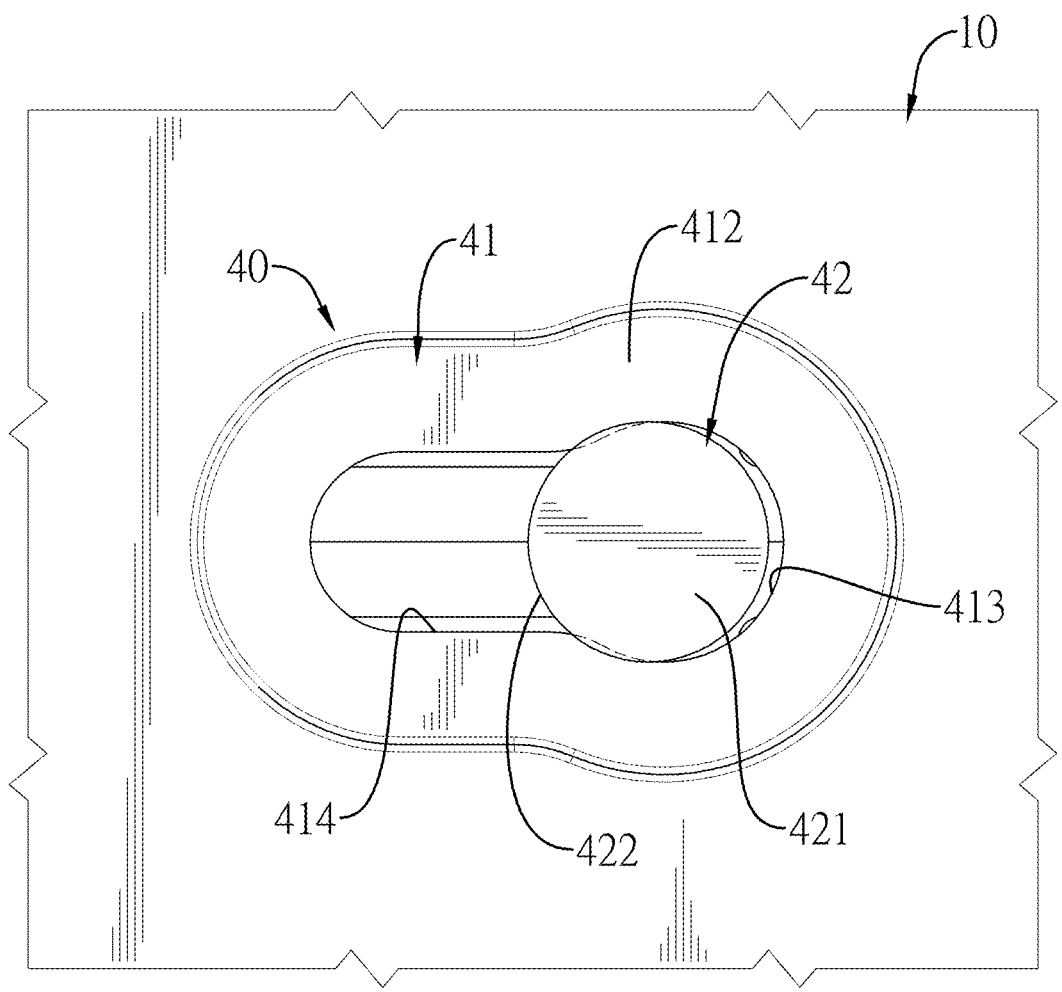
FIG. 6 is a bottom view of the connecting structure of the backlight module in FIG. 4.

With reference to FIGS. 4 to 6, the end portion 421 of the post 42 of the at least one connecting structure 40 forms a shoulder 422 protruding transversely from the end portion 421 and extending through the recess 41 to hook a bottom portion of the guiding surface 412 and forming at least two point contacts with the guiding surface 412 of the recess 41, so as to increase contact area of the end portion 421 of the post 42 and the guiding surface 412 and to improve mobility of the post 42 relative to and guided by the guiding surface 412. In other embodiments, the contact between the shoulder 422 and the guiding surface 412 of the recess 41 of the at least one connecting structure 40 may also be line contact or area contact. For example, the shoulder 422 may protrude transversely from the end portion 421 and have an inclined shape to ensure area contact between the post 42 and the recess 41 of the at least one connecting structure 40 and improve mounting stability of the two components.

With reference to FIGS. 4 to 6, the post 42 of the at least one connecting structure 40 has a column portion 423 having an end connected to the end portion 421, and a diameter of the column portion 423 is smaller than a diameter of the end portion 421. The opening 411 of the recess 41 has an enlarged section 413 and a narrow section 414 which communicate with each other and are configured to let the column portion 423 enter the narrow section 414 from the enlarged section 413. A diameter of the narrow section 414 is smaller than the diameter of the end portion 421. The end portion 421 is configured to pass through the enlarged section 413.

Notably, the enlarged section 413 in accordance with the present invention refers to a section allowing the end portion 421 of the post 42 to pass therethrough, but not limited to the aforementioned embodiments. Relatively, the narrow section 414 in accordance with the present invention refers to a section allowing the column portion 423 to pass through but preventing the end portion 421 from passing through, so the end portion 421 can abut against a side of the narrow section 414.

In the present embodiment, when the reflective sheet 20 and the back plate 10 are mounted, the end portion 421 and the shoulder 422 of the post 42 of the at least one connecting structure 40 pass through the enlarged section 413 of the opening 411 of the recess and abut against the guiding surface 412 of the recess 41. As the reflective sheet 20 expands, the reflective sheet 20 will make the post 42 move along the guiding direction D2, thus the end portion 421 of the post 42 will move along the guiding surface 412 of the recess 41 toward the narrow section 414 in the horizontal direction to generate said drag force in the vertical direction to drag the reflective sheet 20 toward the back plate 10 to move along the assembling direction D1. At the same time, the column portion 423 of the post 42 enters the narrow section 414. Thereby, the shoulder 422 abuts against the guiding surface 412 on a greater area, prevents the end portion 421 from falling from the recess 41, and improves the mounting stability of the post 42 and the recess 41. Preferably, a contour of the shoulder 422 may be elliptical or polygonal, and a contour of the enlarged section 413 of the opening 411 matches that of the shoulder 422. In the present embodiment, the contour of the shoulder 422 is elliptical, so the post 42 may be forced through the recess 41, improving assembling convenience.

Moreover, with reference to FIGS. 1, 2, 5A, and 5B, the light source board 30 has at least one through hole 31 disposed through the light source board 30 and aligned with the at least one connecting structure 40. The post 42 of the at least one connecting structure 40 passes through the at least one through hole 31. The at least one through hole 31 has a contour matching the enlarged section 413 and the narrow section 414 of the opening 411 of the recess 41, so the end portion 421 of the post 42 can penetrate a part of said through hole 31 that corresponds to the enlarged section 413. When the column portion 423 of the post 42 enters the narrow section 414 of the opening 411, the column portion 423 is also adjacent to a part of said through hole 31 that corresponds to the narrow section 414. In this way, said connecting structure 40 provides position limitations for the back plate 10 and the light source board 30 simultaneously, improving stability of overall assembling.

Figure 7:
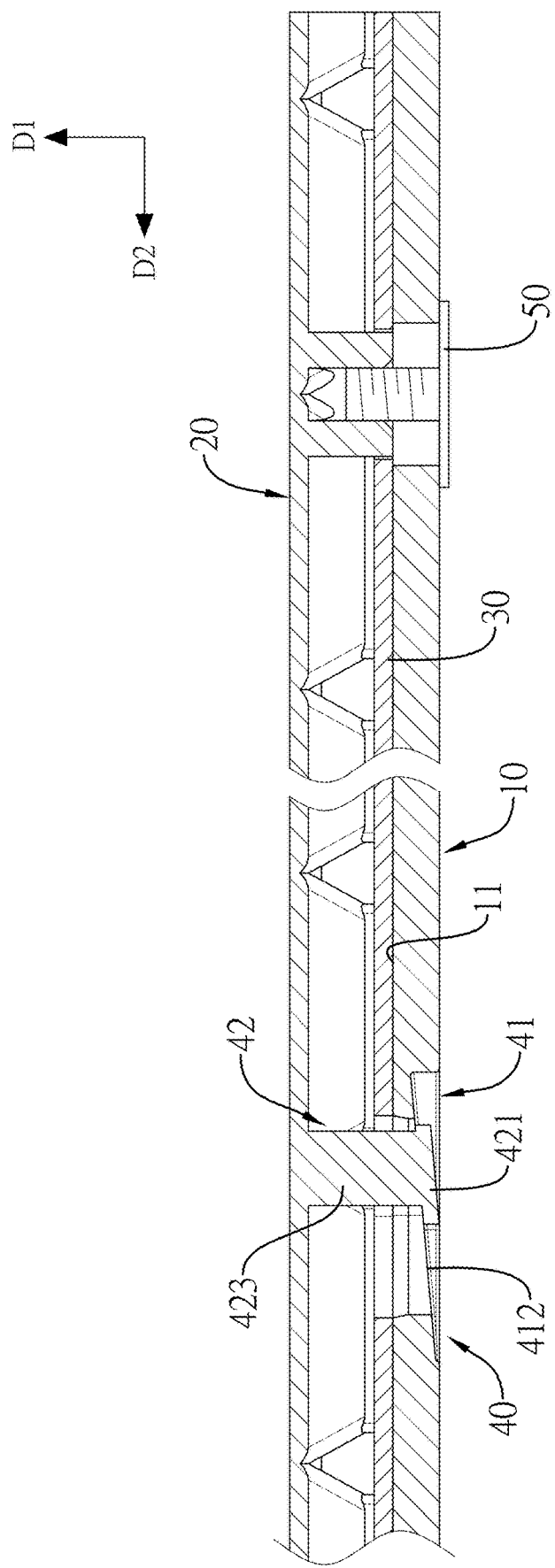
FIG. 7 is an enlarged cross-sectional side view of the backlight module in FIG. 1 depicting a fixing component thereof.

With reference to FIG. 7, in an embodiment of the backlight module in accordance with the present invention, the backlight module further comprises at least one fixing component 50 fixing the reflective sheet 20 and the back plate 10. The at least one connecting structure 40 and the at least one fixing component 50 are arranged at spaced intervals along the guiding direction D2. The at least one fixing component 50 fixes and connects the back plate 10 and the reflective sheet 20 and serves as fixing points. As the reflective sheet 20 expands, the back plate 10 and the reflective sheet 20 have no relative displacement at the fixing points, and the reflective sheet 20 expands outwardly from the fixing points and extends along the guiding direction D2. The at least one connecting structure 40 is arranged just at the position where the reflective sheet 20 expands outwardly along the guiding direction D2 from the fixing points, and thereby effectively generates said drag force to suppress bulging of the reflective sheet 20. Said fixing component 50 can be screws or other elements that are capable of firmly connecting the back plate 10 and the reflective sheet 20.

Figure 8:
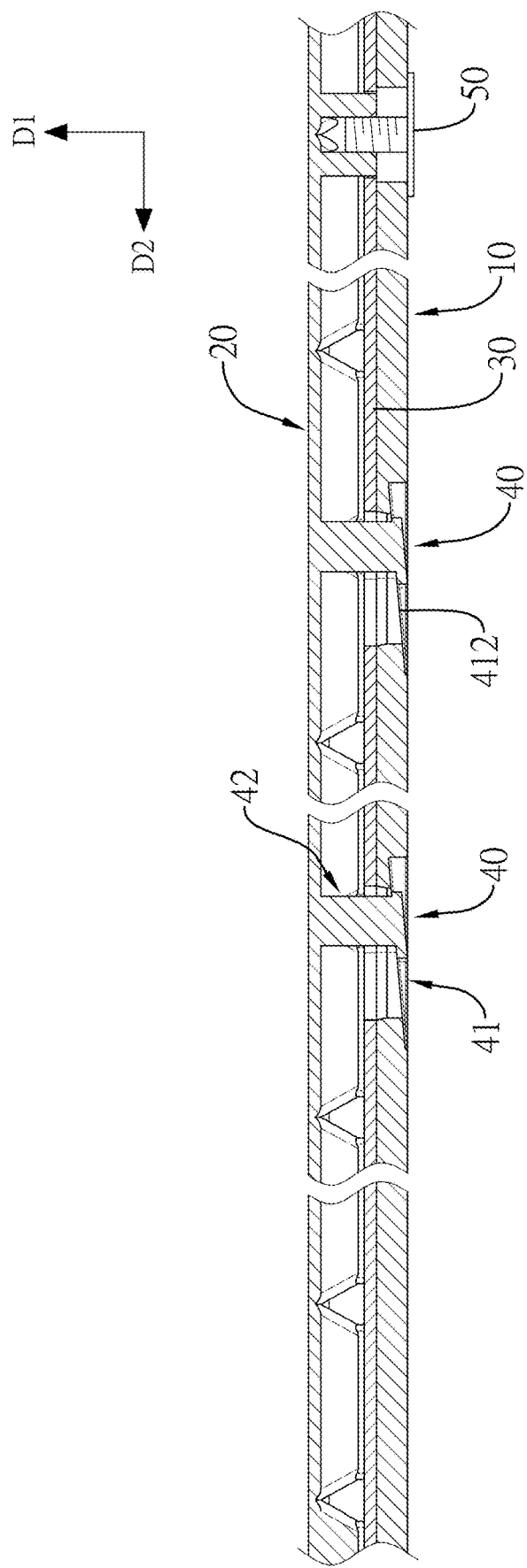
FIG. 8 is an enlarged cross-sectional side view of the backlight module in FIG. 1 depicting connecting structures located between fixing components.

With reference to FIG. 8, in another embodiment, the backlight module May comprise multiple said connecting structures 40 arranged at spaced intervals along the guiding direction D2 from the at least one fixing component 50, and said guiding surfaces 412 of the multiple connecting structures 40 are inclined in the same direction. When said fixing component 50 is located near an edge of the backlight module so that area of a side of the reflective sheet 20 relative to said fixing component 50 is larger than area of the other side of the reflective sheet 20, the larger side of the reflective sheet 20 expands more than the smaller side. By arranging the multiple connecting structures 40 on the larger side of the reflective sheet, and the guiding surfaces 412 of the multiple connecting structures 40 are inclined toward the same direction, each one of the connecting structures 40 can suppress bulging of the reflective sheet 20 so as to improve the bulging-suppressing effect by suppressing bulging of the larger side of the reflective sheet 20. In detail, centered on the at least one fixing component 50, the inclined direction of the guiding surface 412 of each said connecting structure 40 is set for pulling the reflective sheet 20 toward the back plate 10 as departing from said fixing component 50.

Figure 9:
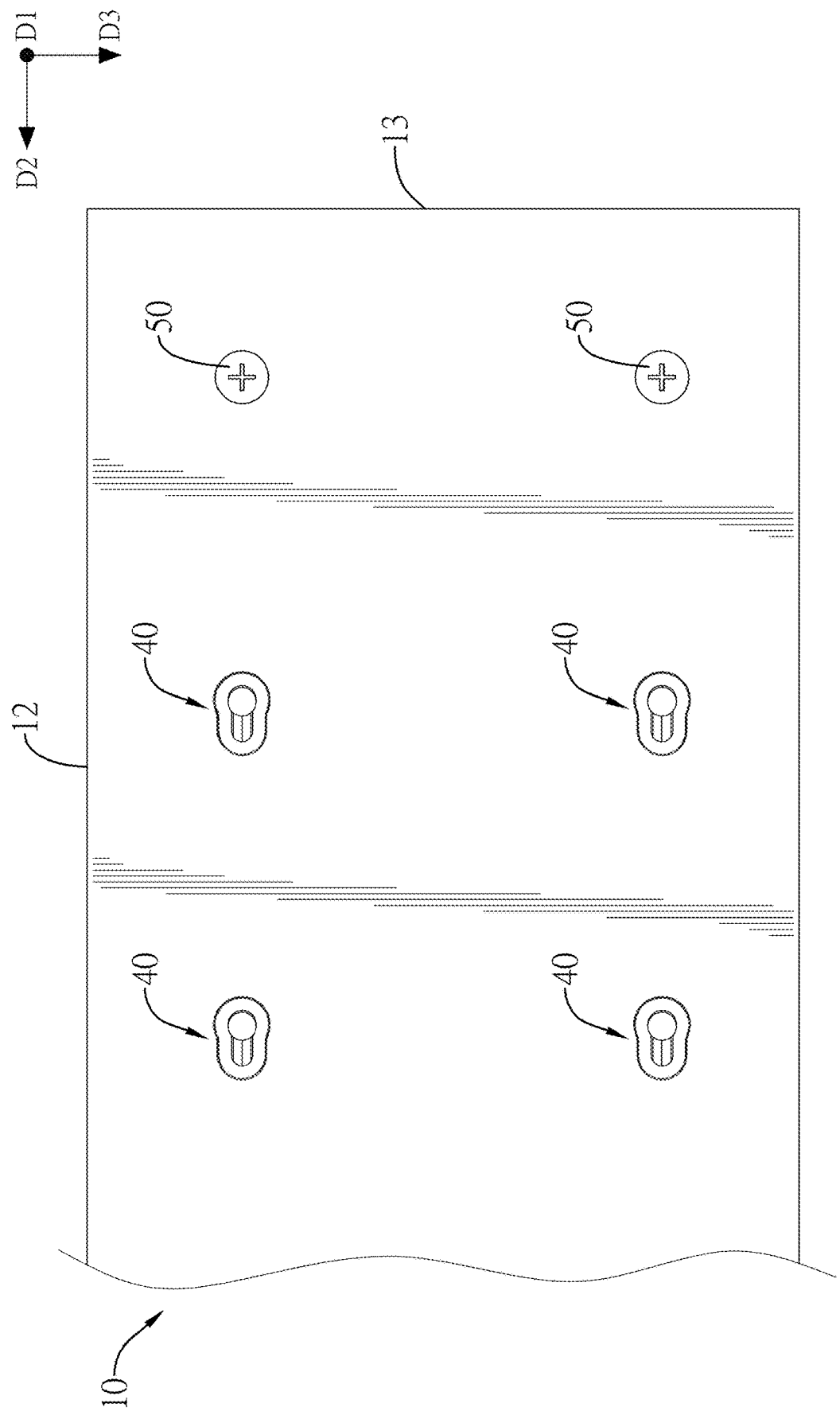
FIG. 9 is an enlarged bottom view of the backlight module in FIG. 8.

With reference to FIGS. 8 and 9, the backlight module comprises a long side 12, and the guiding direction D2 is parallel to the long side 12. The backlight module comprises multiple said connecting structures 40 arranged at spaced intervals along the long side 12 of the backlight module. In other words, when the backlight module has a long side 12 in one direction and has a short side 13 in another direction, the reflective sheet 20 expands more along the long side 12. Therefore, by the multiple connecting structures 40 arranged at spaced intervals along the long side 12, bulging of the reflective sheet 20 can be suppressed section by section. Besides, with reference to FIG. 9, multiple said fixing components 50 may be arranged at spaced intervals on the short side 13 of the backlight module, and multiple said connecting structures 40 are arranged along the long side 12 from each one of the fixing components 50, so expansion of the reflective sheet 20 can be suppressed more effectively, and optical tastes can be assured.

Figure 10:
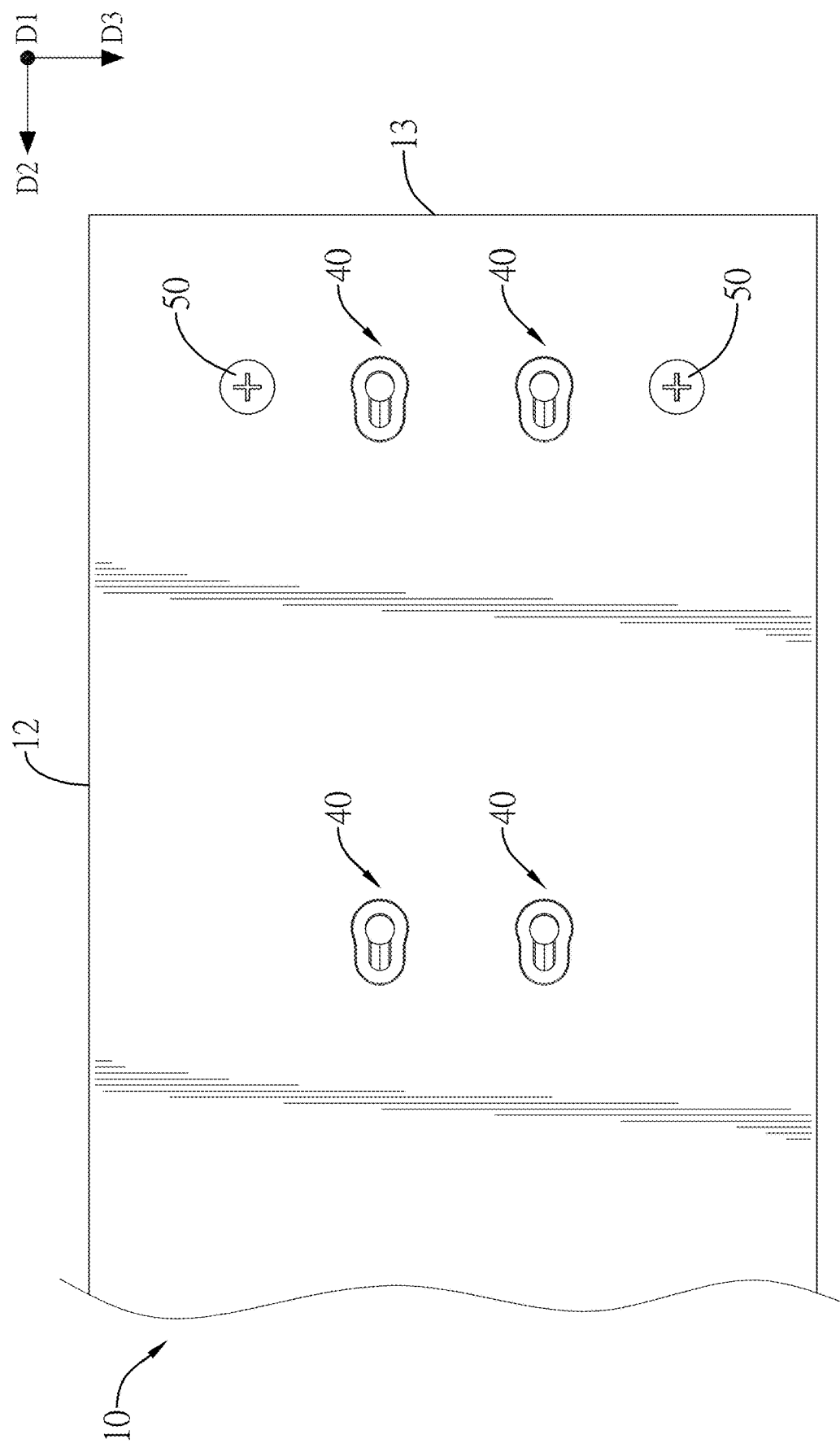
FIG. 10 is an enlarged bottom view of another embodiment of the backlight module in accordance with the present invention.

With reference to FIG. 10, in another embodiment, the backlight module comprises multiple said connecting structures 40 and multiple said fixing components 50, and the multiple connecting structures 40 between adjacent two of the multiple fixing components 50. For instance, the backlight module has a short side 13 extending in another direction relative to the long side 12; in the present embodiment, the short side 13 and the long side 12 are perpendicular to each other, but not limited thereto. Stability of mounting the back plate 10 and the reflective sheet 20 is improved by the multiple fixing components 50. Because portions of the reflective sheet 20 between two of the fixing components 50 have higher potential to bulge along the assembling direction D1, bulging of the reflective sheet 20 can be reduced or avoided by the multiple connecting structures 40 connecting the reflective sheet 20 and the back plate 10, and optical tastes of the backlight module can be maintained.

Figure 11:
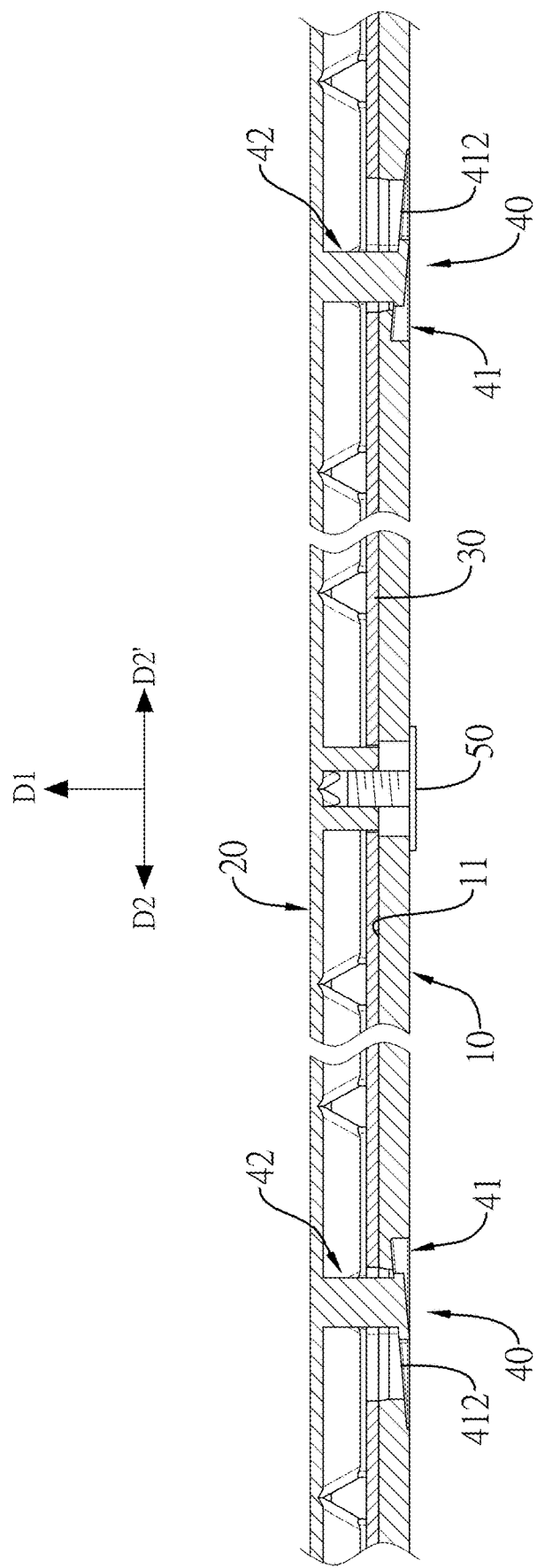
FIG. 11 is an enlarged cross-sectional side view of another embodiment of the backlight module in accordance with the present invention depicting a fixing component located between connecting structures.

With reference to FIG. 11, in another embodiment, the backlight module comprises multiple said connecting structures 40, the at least one fixing component 50 is located between the multiple connecting structures 40, and said guiding surfaces 412 of the multiple connecting structures 40 are inclined toward opposite directions. Since the reflective sheet 20 expands outwardly from the fixing points, two sides of the reflective sheet 20 centered on said fixing component 50 expand toward opposite directions. Therefore, the guiding direction D2 is actually parallel to the supporting surface 11 of the back plate 10, and is defined according to an expanding direction of the reflective sheet 20. For example, when said fixing component 50 is about located on a central position of the backlight module, relative to the fixing component 50, a left side of the reflective sheet 20 expands leftward, and then the guiding direction D2 of the guiding surfaces 412 of said connecting structures 40 is leftward. Similarly, relative to the fixing component 50, a right side of the reflective sheet 20 expands rightward, and then the guiding direction D2' of the guiding surfaces 412 of said connecting structures 40 is rightward.

Accordingly, expansions and bulging of either side of the reflective sheet 20 on said fixing component 50 can be suppressed, and uniformity of optical tastes of the backlight module are thereby assured. In addition, upon demands, the guiding directions D2 of the multiple connecting structures 40 may also be tangent or oblique. As long as the guiding directions D2 of the multiple connecting structures 40 are identical with the expanding direction of the reflective sheet 20, bulging of the reflective sheet 20 can thus be suppressed, and the multiple connecting structures 40 favor mounting stability of the back plate 10 and the reflective sheet 20 as well.

Figure 12:
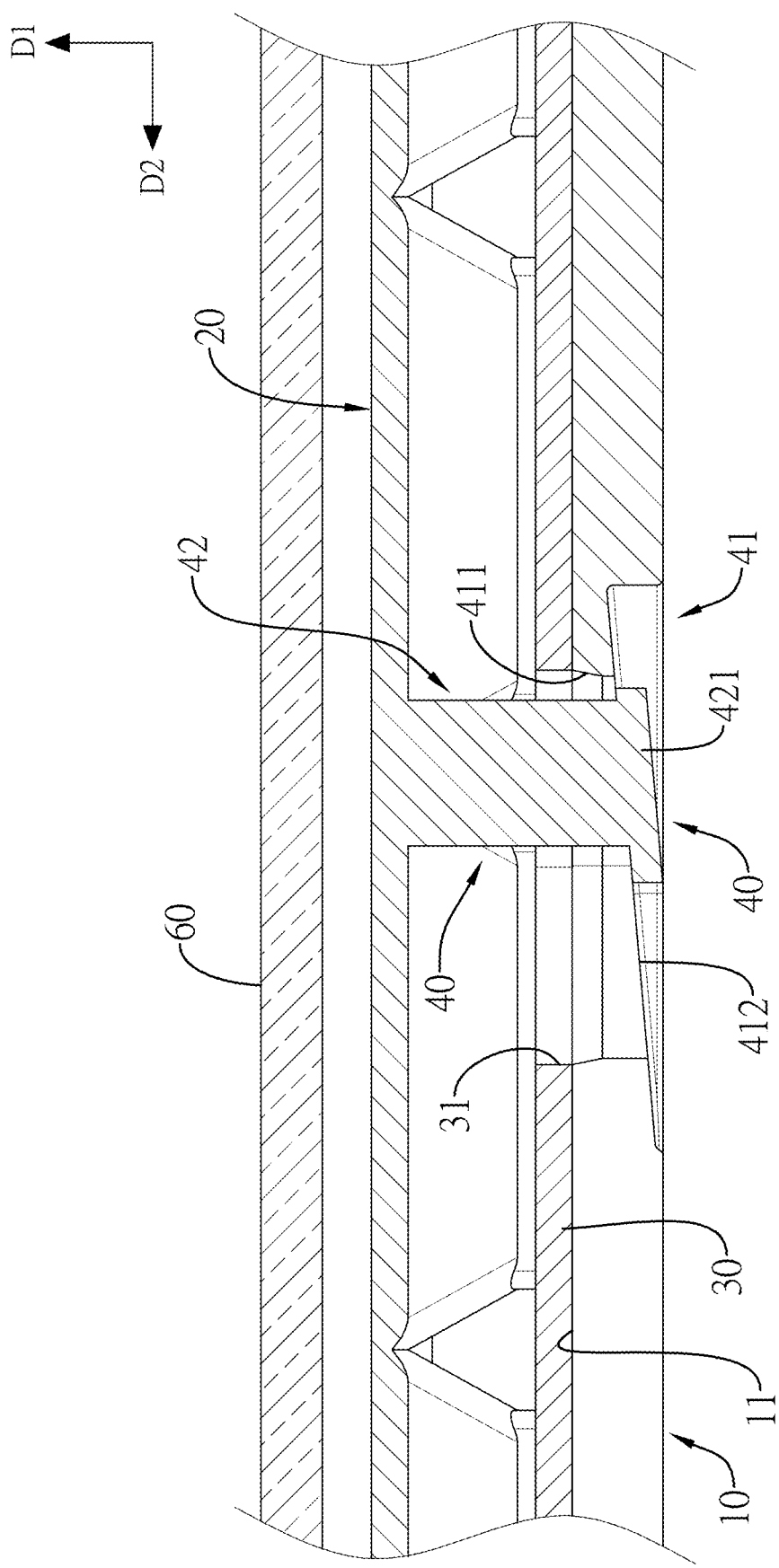
FIG. 12 is an enlarged cross-sectional side view of an embodiment of a display device in accordance with the present invention.

With reference to FIG. 12, an embodiment of a display device in accordance with the present invention comprises one said backlight module and a display panel 60. The display panel 60 is arranged on a side of the reflective sheet 20 away from the back plate 10, so the backlight module is configured to emit light toward the display panel 60. By utilizing said backlight module, the display device can mitigate harm to the optical tastes due to thermal expansion of the reflective sheet 20 and improve reliability of the product. Therefore, the display device is favorable for products bearing high environmental temperature or large temperature differences, e.g. car displays.

For example, position-limiting mechanisms may be formed on a bottom of the reflective sheet through injection molding, and be mounted with corresponding position-limiting mechanisms on the back plate so as to provide 3-axis position-limiting effects. Therefore, defects generated from challenging severe environments may be prevented, labor hours may be reduced, and competition advantages of the direct type backlight module are enhanced. For instance, for car displays or TV displays, development schedules can be shortened, assembling problems can be solved, and production costs are saved.

To conclude, the back plate 10 and the reflective sheet 20 are connected by the at least one connecting structure 40, so when the reflective sheet 20 expands, the post 42 of said connecting structure 40 is guided by the guiding surface 412 of the recess 41 and provides a drag force to suppress bulging of the reflective sheet 20, e.g. Z-axis deformation of the reflective sheet 20. Therefore, the backlight module adapts to challenging severe environments, optical tastes of the backlight module and the display device are maintained, and reliability of the backlight module and the display device is improved.

Even though numerous characteristics and advantages of the present invention have been set forth in the foregoing description, together with details of the structure and features of the invention, the disclosure is illustrative only. Changes may be made in the details, especially in matters of shape, size, and arrangement of parts within the principles of the invention to the full extent indicated by the broad general meaning of the terms in which the appended claims are expressed.

What is claimed is:

1. A backlight module comprising:
a back plate having a supporting surface;
a reflective sheet arranged on the supporting surface of the back plate along an assembling direction;
a light source board disposed between the reflective sheet and the back plate and comprising a substrate board with light sources disposed thereon; and
at least one connecting structure comprising
a recess formed in at least one of the back plate and the reflective sheet, extending therethrough, and having an opening; and
a guiding surface connected to the opening and inclined along a guiding direction relative to the supporting surface, wherein the guiding surface is inclined toward a direction opposed to the assembling direction; and
a post passing through the recess and having
an end portion; and
a shoulder extending through the recess to hook a bottom portion of the guiding surface;
wherein the back plate and the reflective sheet are mounted via the recess and the post.

2. The backlight module as claimed in claim 1, wherein the end portion of the post is capable of abutting and being guided by the guiding surface during thermal expansion of the reflective sheet.

3. The backlight module as claimed in claim 1, wherein the shoulder protrudes transversely from the end portion and forms at least two point contacts with the guiding surface of the recess.

4. The backlight module as claimed in claim 1, wherein the shoulder protrudes transversely from the end portion and forms a surface in contact with the guiding surface of the recess.

5. The backlight module as claimed in claim 1, wherein the post is disposed on the reflective sheet, the recess is disposed on the back plate, and the opening of the back plate is formed on the supporting surface of the back plate.

6. The backlight module as claimed in claim 1, wherein the post has a column portion having
an end connected to the end portion; and
a diameter being smaller than a diameter of the end portion;
the opening of the recess has an enlarged section and a narrow section which communicate with each other and are capable of letting the column portion enter the narrow section from the enlarged section;
a diameter of the narrow section is smaller than the diameter of the end portion; and
the end portion is capable of passing through the enlarged section.

7. The backlight module as claimed in claim 1, wherein the backlight module comprises a long side and multiple said connecting structures;
the guiding direction is parallel to the long side; and
the multiple connecting structures are arranged at spaced intervals along the long side of the backlight module.

8. The backlight module as claimed in claim 1, wherein the backlight module comprises at least one fixing component fixing the reflective sheet to the back plate; and
the at least one connecting structure and the at least one fixing component are arranged at a spaced interval along the guiding direction.

9. The backlight module as claimed in claim 8, wherein the backlight module comprises multiple said connecting structures arranged at spaced intervals from the at least one fixing component along the guiding direction; and said guiding surfaces of the multiple connecting structures are inclined in the same direction.

10. The backlight module as claimed in claim 8, wherein the backlight module comprises multiple said connecting structures and multiple said fixing components; and the multiple connecting structures are arranged between adjacent two of the multiple fixing components.

11. The backlight module as claimed in claim 8, wherein the backlight module comprises multiple said connecting structures;

the at least one fixing component is arranged between the multiple connecting structures; and said guiding surfaces of the multiple connecting structures are inclined in opposite directions.

12. The backlight module as claimed in claim 1, wherein the light source board has at least one through hole disposed through the light source board and aligned with the at least one connecting structure; and the post of the at least one connecting structure passes through the at least one through hole.

13. A display device comprising:

the backlight module as claimed in claim 1; and a display panel arranged on a side of the reflective sheet away from the back plate.

\* \* \* \* \*